United States Patent Office 3,705,215
Patented Dec. 5, 1972

---

3,705,215
PREPARATION OF 2-CHLOROETHYL PHOSPHONATE DIESTERS
Calvin Vogel and David I. Randall, Easton, Pa., assignors to GAF Corporation, New York, N.Y.
No Drawing. Filed Aug. 7, 1969, Ser. No. 848,327
Int. Cl. C07f 9/40
U.S. Cl. 260—970                                    10 Claims

ABSTRACT OF THE DISCLOSURE 2-haloethylphosphonate diesters are prepared from 1-chloro-2-bromo-ethane and an alkali metal salt of a secondary phosphite wherein the reaction is carried out in the presence of an aprotic, dipolar solvent such as N-methyl-2-pyrrolidone. Said diesters are readily hydrolyzed to 2-chloroethylphosphonic acid useful as a plant growth stimulant.

BACKGROUND OF THE INVENTION

Field of the invention

This invention relates to a process for the preparation of 2-haloethylphosphonate esters by the reaction of 1-chloro-2-bromo-ethane and alkali metal salts of secondary phosphites.

Background of the invention

The compound, 2-chloroethylphosphonic acid is known as being a valuable compound as a plant growth stimulant in the agricultural field. However, processes for the preparation of this product have not been satisfactory heretofore as the various processes used have not provided a product of sufficient purity as to obviate the toxicity effects of the impurities contained therein. One of the most suitable intermediates from which this product may be prepared is the corresponding diester which by hydrolysis may be easily converted to the desired 2-chloroethylphosphonic acid. As with the final product however, it is necessary that the diester intermediates also be prepared in sufficiently pure form as to not contain toxic impurities in the product. Accordingly, the present invention provides a process by which the intermediate diesters may be prepared in a purity satisfactory for the preparation of the final desired product.

SUMMARY OF THE INVENTION

It is accordingly one object of this invention to provide a process for the preparation of intermediates which may be converted directly to 2-chloroethylphosphonic acid by hydrolysis.

A further object of the invention is to provide a procedure by which these intermediates may be prepared in stufficiently pure form for direct hydrolysis to the final 2-chloroethylphosphonic acid product.

A further object of the invention is to provide a process for the preparation of 2-chloroethylphosphonate esters from 1-chloro-2-bromo-ethane and an alkali metal salt of a secondary phosphite, wherein the reaction is carried out in the presence of a specific class of solvents.

Other objects and advantages of the present invention will become apparent as the description thereof proceeds.

In satisfaction of the foregoing objects and advantages there is provided by this invention a process for the preparation of 2-chlorethylphosphonate esters by the reaction of 1-chloro-2-bromo-ethane and an alkali metal salt of a secondary phosphite wherein the reaction is conducted in the presence of an aprotic, dipolar solvent in which the dipole moment is 3.5 Debye units or greater.

DESCRIPTION OF THE PREFERRED EMBODIMENTS

According to this invention the 2-chloroethylphosphonate esters are prepared from 1-chloro-2-bromo-ethane and an alkali metal salt of a secondary phosphite according to the following equation:

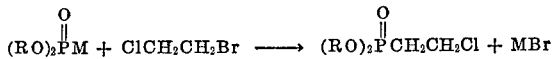

wherein in the above equation, M is an alkali metal, preferably sodium, although it may also be potassium or lithium, and R is an alkyl group containing about 1 to 7 carbon atoms, preferably methyl, or aryl such as phenyl or alkyl-substituted phenyl.

According to this invention, this reaction is carried out in the presence of a particular solvent defined herein as being an aprotic, dipolar solvent in which the dipole moment is 3.5 Debye units or greater. According to this invention, said solvents are generally the tertiary amide solvents and specific solvents which conform to the requirements of this invention which may be mentioned include the N-alkyl lactams such as N-methyl 2-pyrrolidone, dimethyl formamide, N-ethyl-2-piperidone, dimethyl acetamide, dimethyl sulfoxide, hexamethyl phosphoramide, sulfolane and mixtures of these solvents. The solvents are employed in sufficient excess to dissolve the salts used in or formed in the reaction and therefore no particular criticality is to be placed on the amount of solvent employed.

These solvents have been found to be particularly beneficial in conducting this reaction as the solvents not only dissolve the phosphite salts which are employed in the reaction but also have been found to activate the salts and thereby enhance their nucleophilicity and thereby provide an advantageous reaction having definite advantages over those known to the art in that these properties enable the reaction to go to completion.

The alkali metal salts of the secondary phosphites employed as basic reactants in the process of this invention can be prepared as desired but are most preferably formed in situ in the initial stages of the reaction by dissolving the corresponding dialkyl hydrogen phosphite in the solvent selected and then adding sufficient alkali metal to the solution to form the alkali metal salt of the secondary phosphite. Inasmuch as pure alkali metal is added to the solution, it is highly preferred that the reactant and solvent be dried prior to formation of the alkali salt. Formation of the salt will be indicated by hydrogen evolution and its cessation will indicate complete salt formation. However, any other suitable method for forming the alkali metal salts may be employed, although the method defined herein is most convenient.

After the alkali metal salt of the secondary phosphite is formed in the aprotic, dipolar solvent at about room temperature, the ethylene chlorobromide in an approximate stoichiometric ratio is then added to the solution and the solution agitated at room temperature for several hours to allow the reaction to proceed.

In general the reaction is conducted at a temperature ranging from about 15° C. to 40° C. and most preferably about 20° to 30° C. The reaction is also conducted at atmospheric pressure.

After the reaction is complete the resulting solution is poured into water and made acid by the addition of dilute mineral acid such as hydrochloric acid, sulfuric acid, nitric acid and the like to remove the alkali metal bromide salts formed. Thereafter, the products may be extracted with a suitable extractant solution which is a solvent for the product (e.g. diethyl ether), and on removal of the solvent, the desired 2-chloroethylphosphonate diester may be recovered in substantially pure form.

The following examples are presented to illustrate the process of the invention but the invention is not to be considered as limited thereto.

EXAMPLE I

A solution of 11.0 grams (0.1 mole) of dimethyl hydrogen phosphite and 100 ml. of dry N-methyl-2-pyrrolidone was placed in a 250 ml. round bottom three-neck flask fitted with a condenser, stirrer and thermometer. Thereafter, while maintaining the temperature at 20 to 30° C., 2.3 grams (0.1 gram atom) of sodium ribbon was added to the solution. When the addition was complete, the mixture was stirred overnight at room temperature whereupon a gray solution was obtained. Then, 14.3 grams (0.1 mole) of ethylene chlorobromide was added and the solution was stirred at 30° C. for six hours. Thereafter the solution was poured into 500 ml. of water and the solution made acid with dilute 10% hydrochloric acid, extracted with diethylether and the ether dried over anhydrous sodium sulfate. On filtration and removal of the solvent by evaporation, there remained 16 grams which was distilled at 1.5 to 2.0 mm. pressure into four fractions. Fractions 2 and 3, weighing 13 grams, were determined by infrared analysis to consist principally of 2-chloroethyl phosphonate dimethylester.

EXAMPLE II

The process of Example I was repeated except that the solvent was dimethyl formamide employed in the amount of 100 ml. Employing the same reaction conditions and techniques, a similar yield of final product was obtained.

The process has been described herein with reference to certain preferred embodiments. However, the process is not to be considered as limited thereto as certain obvious variations thereon will become obvious to those skilled in the art.

What is claimed is:

1. A process for the preparation of 2-chloroethylphosphonate esters of the formula:

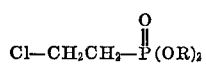

by the reaction of an alkali metal salt of a secondary phosphite of the formula:

wherein M is sodium, potassium or lithium and R is an alkyl group of 1 to 7 carbon atoms or phenyl group in about stoichiometric proportions with 1-chloro-2-bromoethane in the presence of an aprotic, dipolar solvent in which the dipole moment is 3.5 Debye units or greater.

2. A process according to claim 1 wherein the solvent is selected from the group consisting of N-alkyl lactams, dimethyl formamide, dimethyl acetamide, dimethyl sulfoxide, hexamethyl phosphoramide, sulfolane and mixtures thereof.

3. A process according to claim 1 wherein the reaction is conducted at a temperature of about 15 to 40° C.

4. A process according to claim 1 wherein the reaction is conducted in the presence of N-methyl-2-pyrrolidone as the solvent.

5. A process according to claim 1 wherein said solvent is dimethylformamide.

6. A process according to claim 1 wherein M is sodium.

7. A process according to claim 1 wherein R is methyl.

8. A process according to claim 1 wherein said alkali metal salt of a secondary phosphite is formed in situ in the presence of the solvent by the addition of sodium, potassium or lithium to the corresponding dialkyl or diphenyl hydrogen phosphite contained in the solution at room temperature.

9. A process according to claim 1 wherein R is methyl, M is sodium, and said solvent is N-methyl-2-pyrrolidone.

10. A process according to claim 1 wherein R is methyl, M is sodium, and said solvent is dimethylformamide.

References Cited

UNITED STATES PATENTS

| | | | |
|---|---|---|---|
| 2,827,475 | 3/1958 | Coover | 260—970 X |
| 3,491,151 | 1/1970 | Bader | 260—583 DD X |
| 2,634,288 | 4/1953 | Boyer et al. | 260—970 X |
| 3,242,236 | 3/1966 | Moedritzer | 260—970 |

LEWIS GOTTS, Primary Examiner

R. L. RAYMOND, Assistant Examiner

U.S. Cl. X.R.

260—502.4 R, 961